United States Patent [19]

Swander et al.

[11] 4,239,974
[45] Dec. 16, 1980

[54] ELECTRICAL POWER GENERATING SYSTEM

[76] Inventors: Robert E. Swander, 1413 Hill Rd. - Apt. 13; Richard E. St. Pierre, 436 Westham Ridge Rd., both of Charlotte, N.C. 28210

[21] Appl. No.: 10,521

[22] Filed: Feb. 9, 1979

[51] Int. Cl.³ .......................... H02P 9/04; H02J 7/00; H02K 35/00
[52] U.S. Cl. ..................... 290/1 R; 320/61; 322/3
[58] Field of Search ......................... 290/1 R; 310/15; 320/61; 322/3; 307/82, 75-76

[56] References Cited

U.S. PATENT DOCUMENTS

| | | | |
|---|---|---|---|
| 1,916,873 | 7/1933 | Wiggins | 290/1 R |
| 2,119,811 | 6/1938 | Green | 171/209 |
| 3,559,027 | 1/1971 | Arsem | 320/61 |
| 3,944,855 | 3/1976 | Levano | 310/69 |

Primary Examiner—J. V. Truhe
Assistant Examiner—John B. Conklin
Attorney, Agent, or Firm—Bell, Seltzer, Park & Gibson

[57] ABSTRACT

An electrical power generating system is disclosed which utilizes as a source of energy the otherwise wasted energy expended by motor vehicles moving along a roadway. The system includes a vibrational transducer which is mounted in the roadway and which is constructed for producing electrical energy directly from the vibrational energy imparted to the transducer from the motor vehicles passing thereacross. The electrical energy thus produced may be used to charge a storage battery for powering various devices, such as traffic signals, warning devices, and the like.

4 Claims, 4 Drawing Figures

U.S. Patent
Dec. 16, 1980
4,239,974
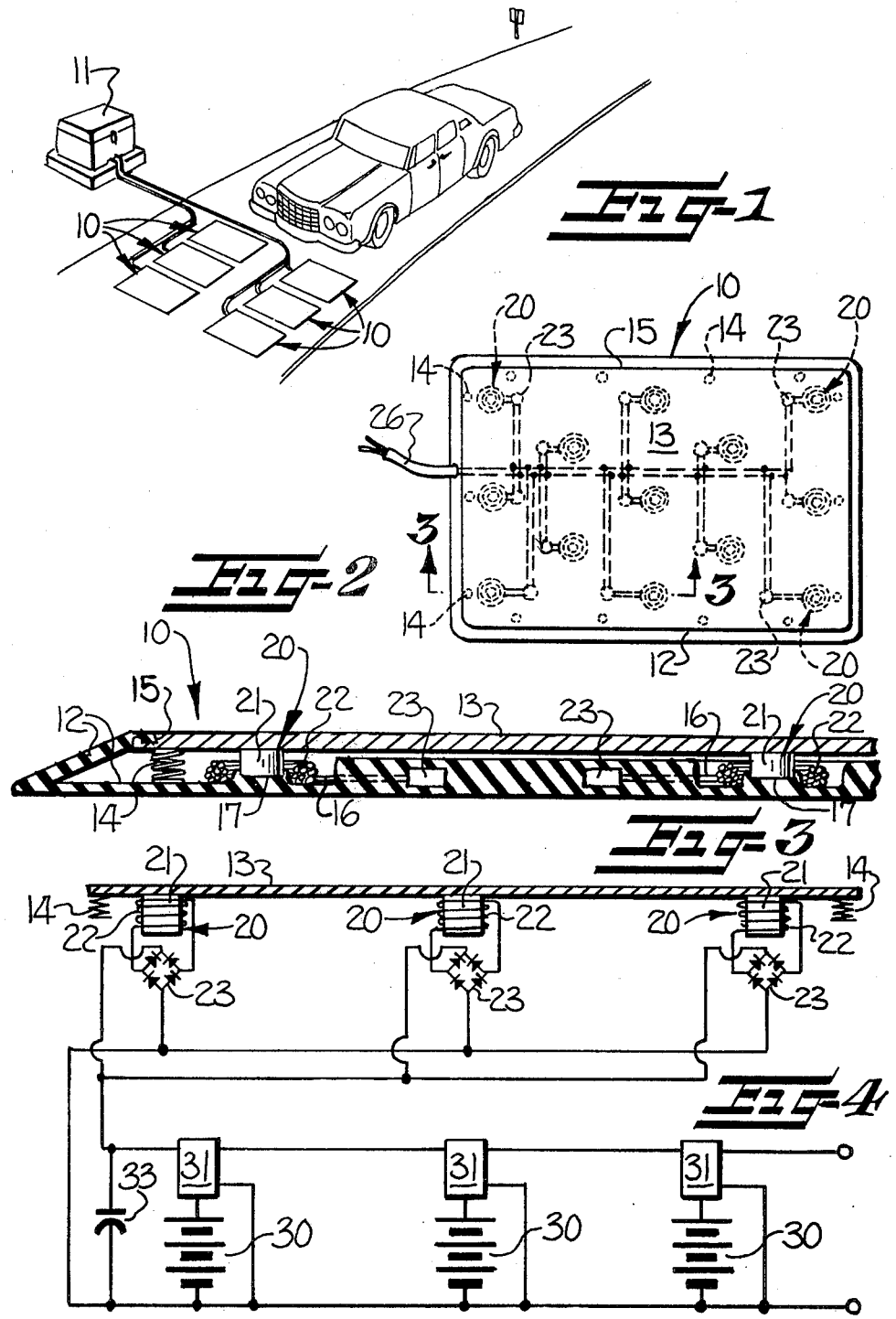

ELECTRICAL POWER GENERATING SYSTEM

FIELD OF THE INVENTION

The present invention relates to a generating system for producing electrical power, and more particularly to an electrical power generating system which utilizes as a source of energy the otherwise wasted energy expended by motor vehicles moving along a roadway.

BACKGROUND OF THE INVENTION

It has long been recognized that the kinetic energy of motor vehicles moving along a roadway provides a potential source of energy for producing electricity, and several approaches for utilizing this potential source of energy have been previously proposed, as for example in prior U.S. Pat. Nos. 1,849,386 and 3,885,163 and in British Pat. No. 1,332,202.

In each of the above noted prior patents, various mechanical arrangements are provided for causing the weight or momentum of the moving vehicle to rotate a shaft from which a conventional electric generator may be operated. Because of the size and complexity of the mechanical arrangements and linkages required, these approaches are impractical, and to applicants' knowledge have never been commercialized.

The present invention provides for generating electrical power in a much more practical and straight-forward manner than as proposed in the above noted patents.

SUMMARY OF THE INVENTION

In accordance with the present invention a relatively small vibratory movement produced by a moving motor vehicle is converted directly into electrical energy by a comparatively simple and compact vibrational transducer device constructed in accordance with the present invention. The transducer utilizes induction coils for converting vibrational movement created by the moving motor vehicles directly into an oscillating electrical current which may be rectified into a direct electrical current for convenient use or storage.

One or more transducers are located in a roadway in the path of travel of a moving motor vehicle so that the moving motor vehicles will pass thereacross and impart vibrational movement to the transducers. Thus, for example the transducers could be mounted in a heavily traveled highway or expressway for being driven over by automobiles and trucks. Similarly, the transducers could be mounted beneath a railroad track for being actuated by the vibrational movement imparted by a moving train.

The power generating system of the present invention can be used to provide electrical power for a variety of different types of devices. For example, it is particularly useful for powering traffic signals, warning devices and the like in remote areas along highways or railroad tracks where power lines are not readily accessible. The power generating system is also quite useful for powering self-powered temporary warning devices for use on highways and the like.

The vibrational transducer of the present invention comprises a generally flat vehicle-engageable surface in the form of a plate which is mounted for vibrational movement in a roadway so that motor vehicles moving along the roadway and passing thereover will impart vibrational movement thereto. Induction coils are operatively associated with the vehicle-engageable plate for producing an oscillating electrical current as a result of the movement imparted to the plate by the motor vehicles. A rectifier connected to the induction coil converts the oscillating electrical current into a rectified direct current. Preferably, in order to obtain a desirable level of electrical output, a plurality of individual induction coils are connected to the plate, with each coil being operable for producing an oscillating electrical current from the vibrational movement. Respective individual rectifiers are connected to each of the individual coils for producing a rectified direct current therefrom, and the outputs of the respective individual rectifiers are connected together for combining the respective rectified currents from the individual induction coils. The thus generated electrical power may be stored until needed in a storage battery.

In the preferred form of the invention illustrated herein, the transducer device is a self-contained, portable mat-like unit adapted for being either permanently or temporarily mounted in a roadway in the path of moving vehicles. The transducer device includes a mounting base and an overlying vehicle-engageable member in the form of a plate carried by the mounting base and mounted for vibrational movement with respect to the base. Each of the induction coils includes a permanent magnet and a cooperating winding associated therewith. The magnet and winding are connected to the base and to the overlying plate in such a way that vibrational movement of the plate relative to the base causes relative movement between the permanent magnet and the winding to thereby generate an induced oscillating electrical current in the winding.

BRIEF DESCRIPTION OF THE DRAWINGS

Some of the features and advantages of the invention having been stated, others will become apparent as the description proceeds when taken in connection with the accompanying drawings, in which FIG. 1 is a perspective view showing the generating system of the present invention as installed in a highway for being driven over by automobiles and trucks;

FIG. 2 is a plan view of a vibrational transducer device constructed for producing electricity from the vibrational movement produced by moving motor vehicles;

FIG. 3 is a cross-sectional view of the transducer device taken substantially along the line 3—3 of FIG. 2; and FIG. 4 is a schematic wiring diagram of the generating system of the present invention.

DESCRIPTION OF ILLUSTRATIVE EMBODIMENTS

Referring more particularly to the drawings, FIG. 1 illustrates a typical installation of the power generating system of the present invention. As illustrated, a plurality of vibrational transducers, generally indicated by the reference character 10 are located on the surface of a highway in position for being driven over by the tires of automobiles and trucks traveling along the highway. The vibrational transducers 10 are constructed as described more fully hereinafter for generating electrical power directly from the vibrational movement imparted to the transducer by the vehicles traveling along the highway. The electrical power generated by the vibrational transducers is employed to charge a storage battery in a suitable housing 11 conveniently located alongside the highway. The storage battery may be used to power various devices, as for example a traffic warning signal either using the direct current of the battery or after converting to alternating current.

In the illustrated embodiment of the invention, the vibrational transducer 10 is in the form of a relatively thin generally flat mat-like unit of a size and construction adapted for being either temporarily or permanently mounted in the roadway. More particularly, as best illustrated in FIG. 3, the transducer includes a mounting base 12 formed of a suitable durable nonferrous material such as rubber or aluminum and an overlying vehicle engageable plate 13 carried by the mounting base 12. As illustrated, springs 14 or other suitable resilient supporting members are provided at spaced locations along the perimeter and over the surface of the mounting base 12 for resiliently supporting the plate 13 and mounting the same for movement relative to the base upon engagement by a motor vehicle. The plate 13 is also formed of a durable nonferrous material such as aluminum. The mountng base 12 and the plate 13 are joined together along a waterproof seam 15 at the marginal edges of the transducer to form a water tight self-contained unit.

Located interiorly of each transducer 10 is a plurality of induction coils 20 located at spaced locations over the surface of the transducer, with each coil 20 cooperating with the overlying plate 13 for producing an oscillating electric current from the vibrational movement of the plate. More particularly, each of the induction coils 20 includes a permanent magnet 21 and a cooperating winding 22 associated with the magnet. As illustrated, the winding 22 is in the form of a toroidal coil, and the mounting base 12 includes a molded recess or well 16 for receiving and securing the winding to the base. The permanent magnet 21 is restingly received in the central opening of the toroidal winding 22 and is adapted for movement on a vertical axis with respect to the surrounding winding. The overlying plate 13 engages the uppermost end portion of the magnet 21, and upon being driven over by a motor vehicle, the plate 13 will be deflected downwardly to cause the magnet 21 to move downwardly relative to the surrounding winding 22. As illustrated, an upwardly extending resilient protruberance 17 is formed in the floor of the well 16 which receives the winding 22, this protruberance 17 extending into the central opening of the coil and serving as a resilient supporting and cushioning member for the magnet 21 to cause the magnet to return upwardly to its original position following the downward movement.

It will thus be seen that when a motor vehicle passes over the vibrational transducers 10, the engagement of the plate 13 by the wheels of the motor vehicle will deflect the plate downwardly and impart vibrational movement thereto which produces an induced oscillating electrical current in each of the windings 22. The deflection of the plate 13 is relatively small, only a fraction of an inch, and thus does not in any way interfere with the normal travel of the vehicle along the roadway or present a hazard to the safe movement of the vehicle.

Since the induction coils are spaced with respect to one another throughout the length and width of the transducers, the vibrational movement of the various magnets are not necessarily in unison. Consequently, there is no assurance that the oscillating electrical currents induced in the various windings will be in phase with one another. To prevent the oscillating current of one winding from cancelling out an out-of-phase oscillating current of another coil, respective individual rectifiers 23 are connected to each winding for converting the oscillating current of the winding to a rectified direct current. As indicated in the schematic wiring diagram of FIG. 4, a conventional full wave rectifier 23 is connected to each winding 22 and conveniently mounted in the base alongside the induction coil. The outputs of the respective rectifiers are electrically connected together for combining the respective rectified direct currents produced thereby. A capacitor 33 may be connected across the output line, if desired, for filtering or smoothing the rectified direct current. As illustrated, the electrical power from the combined outputs of the respective coils is conveyed along a cable 26 from each transducer device to a storage battery located in a suitable housing 11 located alongside the highway.

As illustrated in the schematic wiring diagram of FIG. 4, the electrical power generated by the transducers is used to charge a plurality of storage batteries 30. Preferably, and as illustrated, the batteries are connected in parallel and each battery 30 has a battery charging regulator 31 connected thereto. When a battery reaches its fully charged condition, the regulator 31 associated with that battery decreases or shuts off the charging current to the battery to avoid overcharging of the battery and to allow the charging current to be more efficiently utilized by one of the other batteries which is in a lower state of charge. Battery charging regulator devices of this type are commercially available and the circuitry which is used therein is well known in the art.

While a single vibrational transducer 10 can be suitably employed, it should be understood that in many installations, depending upon the power demands, the amount of traffic, and other considerations, it may be desirable to provide a plurality of these devices in a roadway with the transducers being serially arranged, as shown in FIG. 1, so that motor vehicles moving along the roadway will pass successively thereacross to generate power for a longer period of time than with a single transducer. In this manner, an increased level of power generation will be obtained from the same number of moving motor vehicles.

It should also be understood that the transducers are adapted for either being permanently or temporarily mounted in a roadway. When permanently installed, it may be desirable for the transducers to be recessed in the roadway so that the upper surface thereof is even with the surrounding road bed. However, because of the relatively thin self-contained mat-like construction of the transducers, the transducers may conveniently be used on a temporary basis by merely positioning them on the surface of the roadbed and securing them by nails, spikes or the like to prevent unwanted movement by the moving vehicles.

While the present invention has been specifically illustrated herein as applied to the generation of power from automobiles moving along a highway, it will be understood that the present invention is capable of being used in other installations for generating power from other types of vehicles. Thus, for example, the transducers could be mounted beneath a railroad track for being actuated by the vibrational movement imparted by a train moving along the track.

In the drawings and specification there has been set forth a preferred embodiment of the invention, and although specific terms are employed, they are used in a generic and descriptive sense only and not for purposes of limitation.

What is claimed is:

1. A generating system for producing electrical power from otherwise wasted energy expended by motor vehicles moving along a roadway, said generating system comprising a plate mounted for vibrational movement in a roadway so that motor vehicles moving along a roadway and passing over the plate will impart vibrational movement to the plate, a plurality of individual induction coils cooperating with said plate, each comprising a permanent magnet and a cooperating winding at least one of said magnet and said winding being mounted for direct engagement by said plate to provide reciprocating movement relative to the other upon vibrational movement of said plate for thereby generating an induced oscillating current in the winding as a result of the vibrational movement of said plate, respective individual rectifiers connected to each of said individual induction coils and each being operable for producing a rectified direct current from the respective oscillating electrical currents, a storage battery, and means connecting the outputs of the respective individual rectifiers to said storage battery for combining the respective rectified direct currents from the individual induction coils and storing the electrical power in said battery until needed.

2. A generating system for producing electrical power from otherwise wasted energy expended by motor vehicles moving along a roadway, said generating system comprising a plurality of serially arranged plates positioned in a roadway so that motor vehicles moving along the roadway will pass successively thereacross, said plates being mounted for vibrational movement so that the moving vehicles passing thereover will impart vibrational movement to the plates, a plurality of individual induction coils cooperating with each of said serially arranged plates, each induction coil being operable for producing an oscillating electrical current from the vibrational movement of the plate, respective individual rectifier means connected to each of said individual induction coils and operable for producing a rectified direct current from the oscillating electrical current, means electrically interconnecting the outputs of the respective individual rectifier means for combining the respective rectified direct currents from the individual induction coils, and each of said individual induction coils includes a permanent magnet and a cooperating winding, at least one of said magnet and said winding being mounted for direct engagement by said plate to provide reciprocating movement relative to the other upon vibrational movement of said plate for thereby generating an induced oscillating current in the winding as a result of the vibrational movement of said plate.

3. A generating system for producing electrical power from otherwise wasted energy expended by motor vehicles moving along a roadway, said generating system comprising a self-contained mat-like transducer positioned in overlying relation on the surface of a roadway so that motor vehicles moving along the roadway will pass thereacross, said transducer comprising a mounting base and an overlying plate carried by said base and mounted for vibrational movement with respect thereto upon engagement by a motor vehicle passing thereacross, a plurality of induction coils provided in said transducer, each induction coil including a permanent magnet, a cooperating winding, and means associated with each of said magnets and its cooperating winding for mounting at least one of said magnet or said cooperating winding for direct engagement by said plate to provide reciprocating movement relative to the other of said magnet or cooperating winding upon vibrational movement of said plate for thereby generating an induced oscillating current in the winding, respective individual rectifier means connected to each of said windings and operable for producing a rectified direct current from the oscillating electrical current in said winding, and means electrically interconnecting the outputs of the respective individual rectifiers for combining the respective rectified direct currents from the individual induction coils.

4. A generating system as set forth in claim 1 wherein said induction coils are spaced from one another throughout the length and width of said plate and arranged in a plurality of rows with a plurality of induction coils in each row.

* * * * *